July 16, 1935.  E. F. BALL  2,008,483
WEEDER
Filed March 5, 1934  3 Sheets-Sheet 1
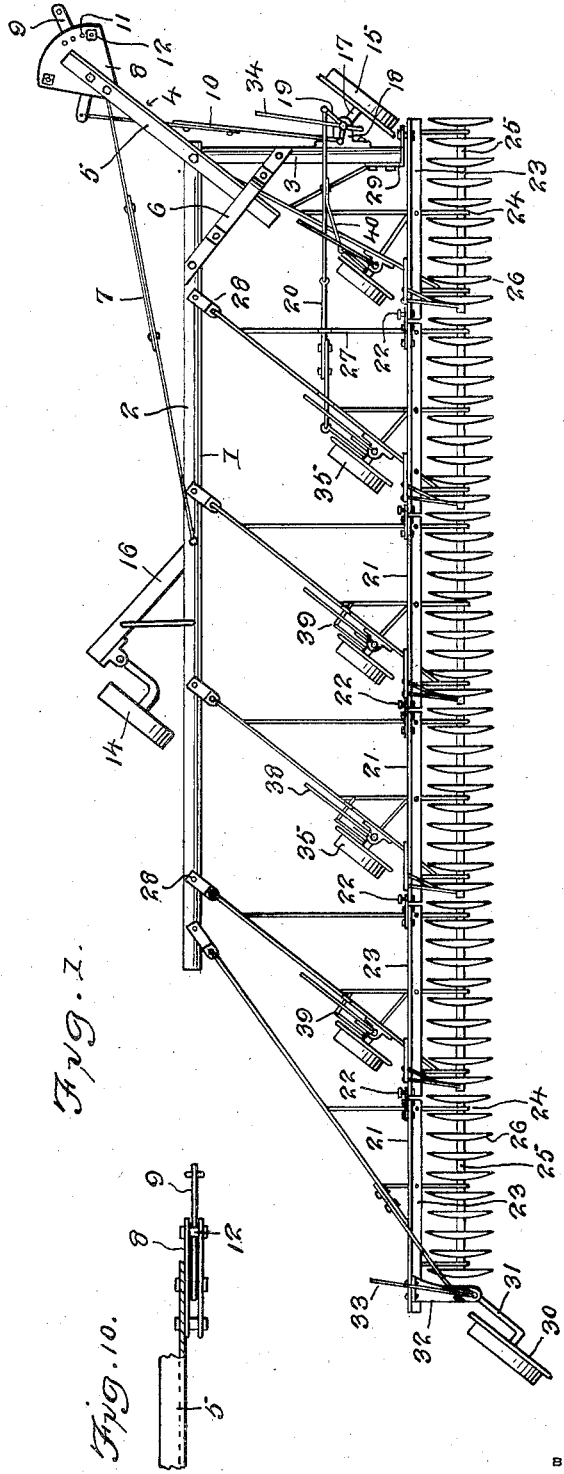
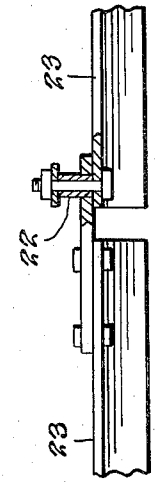
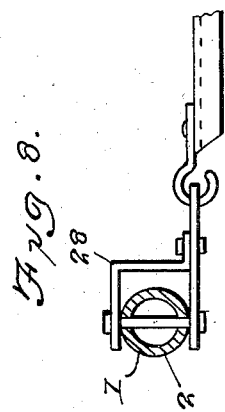
Emery F. Ball
INVENTOR
BY Victor J. Evans & Co
ATTORNEY

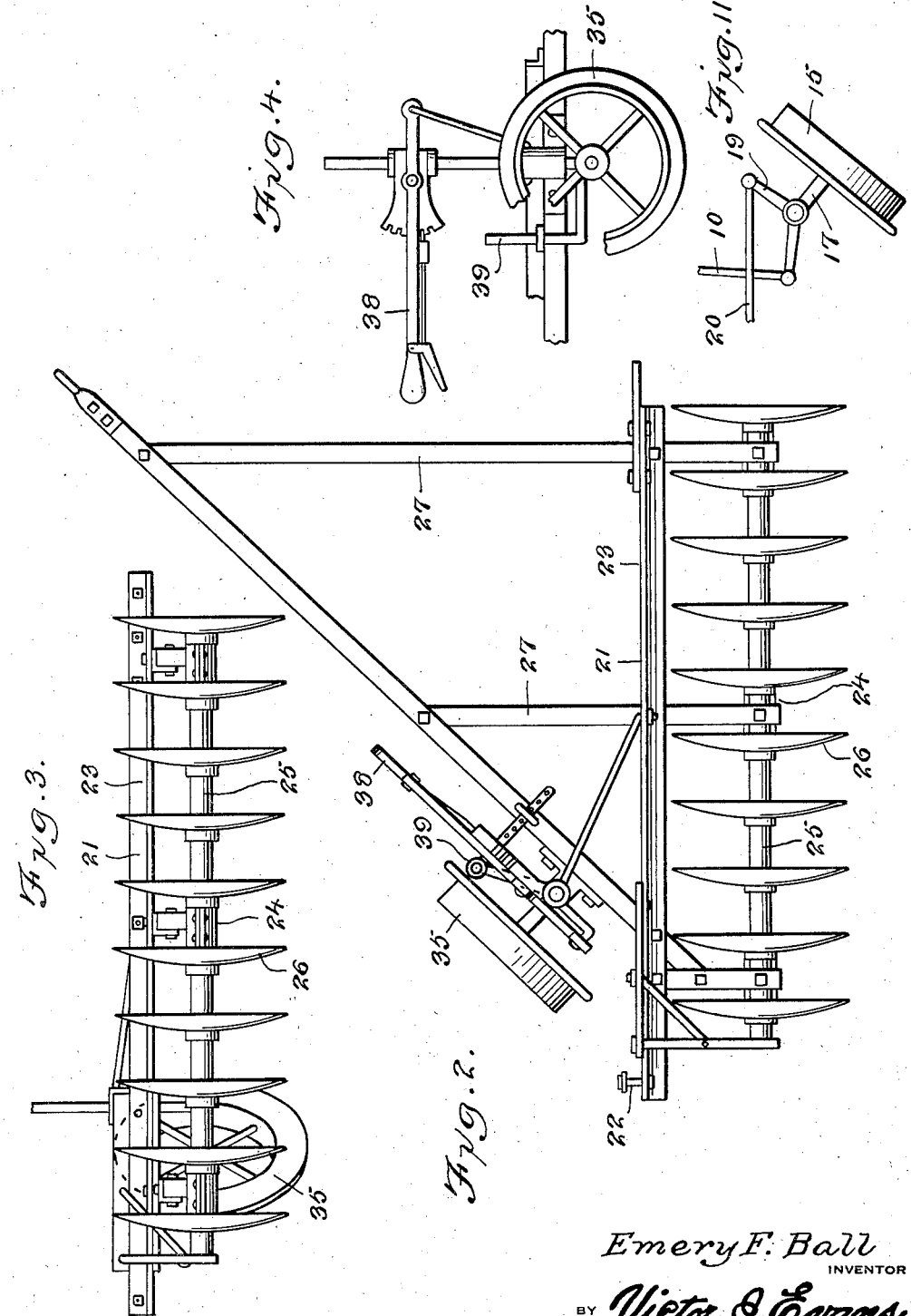

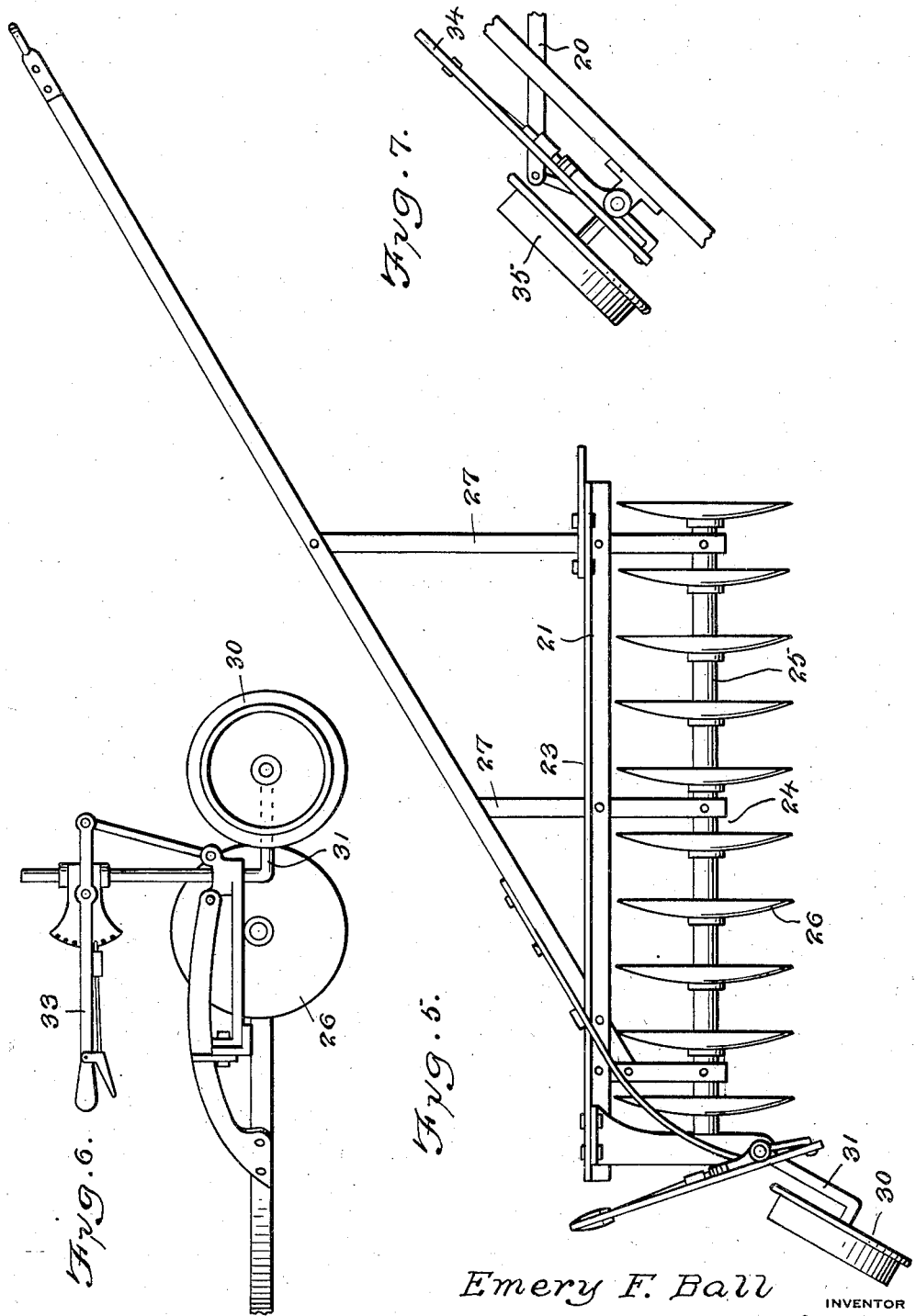

Patented July 16, 1935

2,008,483

UNITED STATES PATENT OFFICE 2,008,483

WEEDER

Emery F. Ball, Plains, Kans.

Application March 5, 1934, Serial No. 714,149

1 Claim. (Cl. 97—77)

This invention relates to weeders and has for the primary object the provision of a device of the above stated character which will efficiently sever weeds and grass growth and lightly work or cultivate the soil preparatory to planting and consists of a series of detachably connected gangs employing in their construction discs to act on the ground and travel at an angle to the line of draft and each gang being allowed to move upwardly and downwardly relative to the adjacent gang whereby the gangs may readily follow the contour of the ground.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a plan view illustrating a weeder constructed in accordance with my invention.

Figure 2 is a similar view illustrating one of the gangs.

Figure 3 is a rear elevation illustrating the same.

Figure 4 is a detail view illustrating the means for raising and lowering the gang with respect to the ground for varying the cutting action of the discs.

Figure 5 is a plan view illustrating one of the end gangs.

Figure 6 is a detail view illustrating the means for raising and lowering the gangs shown in Figure 5 with respect to the ground.

Figure 7 is a fragmentary plan view illustrating the ground wheel to one of the gangs located adjacent the draft means.

Figure 8 is a detail sectional view illustrating a clevis or pivotal connection employed between the gangs and the main frame.

Figure 9 is a fragmentary sectional view illustrating the pivotal connection between the gangs.

Figure 10 is a detail sectional view illustrating the draft hitch.

Figure 11 is a fragmentary plan view illustrating the mounting of one of the ground wheels.

Referring in detail to the drawings, the numeral 1 indicates a main frame consisting of members 2 and 3 arranged at right angles to each other and suitably connected. A draft hitch 4 is connected to the main frame and consists of a tongue or draft bar 5 pivoted to the main frame where the members 2 and 3 join and extends forwardly and rearwardly of the bar 2 and at an angle thereto. The rear end of the draft bar 5 is slidably supported by a brace 6 which connects the members 2 and 3. The draft bar 5 is also connected to the member 2 of the main frame by a brace 7, one end of which is pivoted to the draft bar adjacent the forward end thereof while the other end is pivoted to the member 2 substantially intermediate the ends of the latter. A substantially triangular-shaped plate 8 is secured to the forward end of the draft bar 5 and mounted for pivotal movement with respect to the plate 8 is a lever 9, one end of which is adapted for connection to a draft source while the other end is pivotally connected to a brace or tie 10, the other end of which is connected to one of a series of connected ground wheels so that said ground wheels will be steered in accordance with the line of draft. The lever 9 includes angularly related portions projecting beyond edges of the plate 8, the plate 8 is provided with a series of openings 11, any one of which receives a pin 12, the purpose of which is to limit the pivotal movement of the lever 9 in a given direction for varying the line of travel of the device with respect to the line of draft.

The main frame 1 is supported by ground wheels 14 and 15. The axle of the ground wheel 14 is pivoted to an arm 16 carried by the member 2 of the main frame. The arm 16 extends angularly to the member 2 with the ground wheel 14 traveling in advance of the member 2. The location of the ground wheel 14 supports one end of the main frame.

The wheel 15 is journaled to a stub axle 17, the latter being journaled to a bracket 18 secured to the member 3 of the main frame. The stub axle 17 is equipped with a steering arm 19 pivoted to one end of a connecting bar or link 20, the latter being connected to ground wheels of plow gangs which will be hereinafter more fully described.

Paralleling the member 2 of the frame 1 and arranged rearwardly thereof are series of gangs 21 pivotally and detachably connected, as shown at 22, whereby the gangs may be separated when desired and also the gangs may move upwardly and downwardly relative to each other when passing over uneven ground. Each gang consists of a bar 23 paralleling the member 2 of the main frame and carries brackets 24 for rotatably supporting the shaft 25 on which is mounted a series of relatively spaced plow discs 26. A connecting frame 27 is secured to the brackets 24 and extends forwardly of the discs 26 and is of substantially triangular shape having its apex or forward end connected to the member 2 of the main frame by a clevis 28 which permits pivotal movement between the connecting frame and the main frame, as well as permitting the connecting frame to be detached from the main frame when desired. The bar 23 of one of the end gangs is connected to the end of the member 3 of the main frame by a bracket 29. The other end gang is supported by a ground wheel 30 traveling in rear of the disc and the axle 31 thereof is journaled to a bracket 32. The bracket 32 also supports a hand operated means 33 for raising and lowering the ground wheel 30. The stub axle 17 of the wheel 15 is equipped with a raising and lowering means 34. Thus it will be seen that one end of the main frame may be adjusted upwardly and downwardly for varying the depth of cutting action of the gang adjacent thereto. The gangs arranged between the end gangs are each provided with ground wheels 35, the axles of which are journaled to the connecting frames 27 of said gangs. The axles of the wheels 35 have adjusting means 33 whereby their respective gangs through the connecting frames may be raised and lowered for varying their cutting or plowing depths. The axles of the wheels 35 are of the stub axle type and have steering arms 39. The steering arms 39 of certain of the wheels 35 are adjustably connected to their respective connecting frames whereby the angle of the wheels 35 to the cutting discs may be varied. By referring to Figure 1 it will be seen that the wheels 35 are arranged angularly to the cutting discs and are aligned with the line of draft. In other words, the wheels 35 are adjusted to travel with the draft mechanism while the cutting discs travel at an angle thereto, thereby permitting the discs to more effectively sever growth and act upon the soil.

The stub axles of the wheels 35 belonging to a pair of gangs located next to the wheel 15 have their respective steering arms of different lengths, one of which is connected to the link or bar 20 while the other is connected to a link 40 which is in turn connected to the link 20. The last-named pair of ground wheels 35 and the wheel 15 swing simultaneously while on a left hand turn the wheel 15 swings at a greater angle than the wheel 35 next thereto and the other wheel 35 swings at a less angle than said wheel 35 connected to the bar 20 by the link 40. This arrangement permits the device to more readily swing on a left hand turn and which type of turn is more frequently employed during the use of this device.

Having described the invention, I claim:

A weeder comprising a plurality of pivotally connected gangs arranged in longitudinal alignment and each including a plurality of rotatable discs, a main frame consisting of a pair of connected members arranged at right angles to each other and located in advance of the gangs and one of said members paralleling the gangs and the other member connected to one of the gangs, draft means connected to the frame where the members thereof join and arranged angularly to the discs, auxiliary frames connected to the main frame and to the gangs and each being of substantially triangular shape, ground wheels adjustably connected to the auxiliary frames immediately in advance of the gangs, and ground wheels adjustably connected to the members of the main frame.

EMERY F. BALL.